J. G. LAWSHE.
SUPERHEATING MANIFOLD.
APPLICATION FILED JAN. 5, 1918.
1,317,712.
Patented Oct. 7, 1919.
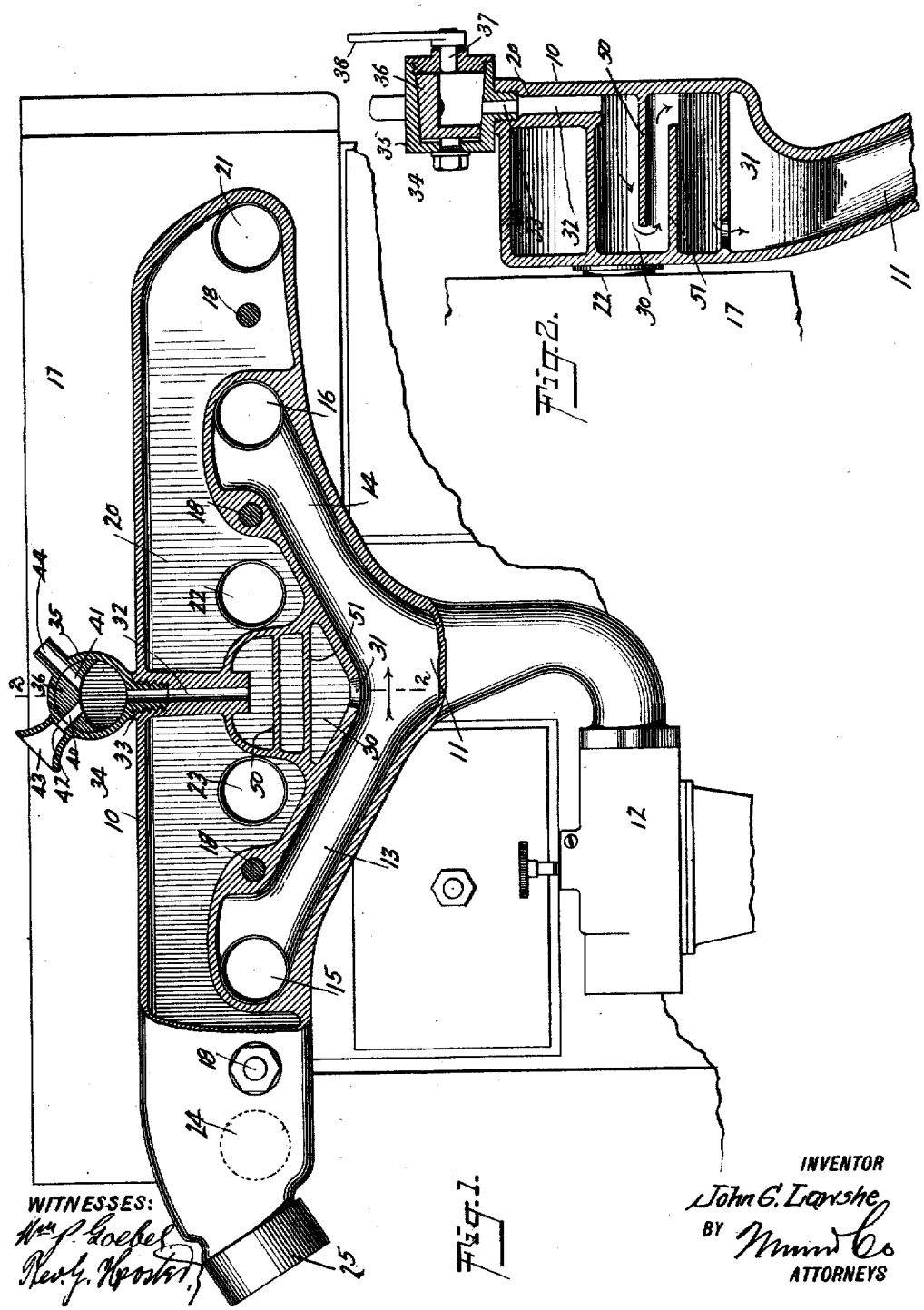
INVENTOR
John G. Lawshe
BY
ATTORNEYS
WITNESSES:

UNITED STATES PATENT OFFICE.

JOHN G. LAWSHE, OF FLEMINGTON, NEW JERSEY.

SUPERHEATING-MANIFOLD.

1,317,712.  Specification of Letters Patent.  Patented Oct. 7, 1919.

Application filed January 5, 1918. Serial No. 210,510.

*To all whom it may concern:*

Be it known that I, JOHN G. LAWSHE, a citizen of the United States, and a resident of Flemington, in the county of Hunterdon and State of New Jersey, have invented a new and Improved Superheating-Manifold, of which the following is a full, clear, and exact description.

The invention relates to internal combustion engines such as are used in automobiles and similar vehicles, and its object is to provide a new and improved superheating manifold arranged to supplement the usual explosive mixture with a superheated charge of air or steam or both to enrich the explosive mixture and thus render the same more forceful.

In order to accomplish the desired result, the manifold is provided with the usual passage adapted to connect the carbureter with the engine cylinders, and is also provided with the usual exhaust chamber connected with the exhausts of the engine cylinders, and a mixing and superheating chamber which is integral with the manifold and extends within the said exhaust chamber, the said mixing chamber being connected with the said passage and being highly heated by the exhaust gases passing into the said exhaust chamber, the said mixing and superheating chamber being provided with means for supplying it with air or steam or a mixture of both.

A practical embodiment of the invention is represented in the accompanying drawings forming a part of this specification, in which similar characters of reference indicate corresponding parts in both views.

Figure 1 is a sectional side elevation of the superheating manifold as applied to a Ford automobile engine, parts being shown in elevation; and Fig. 2 is a transverse section of the same on the line 2—2 of Fig. 1.

The manifold 10 is provided with the usual passage 11 connected at one end with a carbureter 12 and provided at its other end with two branches 13 and 14 connected at their ends at 15 and 16 with the valves of the engine cylinders 17 to which the manifold is fastened by bolts 18 or other suitable fastening means. Within the manifold 10 is formed an exhaust chamber 20 connected at 21, 22, 23 and 24 with the exhaust valves of the engine cylinders, and the exhaust chamber 20 is provided with an outlet 25 connected with a muffler or the like.

Within the exhaust chamber 20 is arranged a mixing and superheating chamber 30 forming an integral part of the manifold and located adjacent the junction of the branch pipes 13 and 14, as plainly indicated in Fig. 1. This mixing and superheating chamber 30 is connected by a port 31 with the branch pipes 13 and 14, and the said mixing chamber is provided opposite the said port 31 with an inlet 32 forming an integral part of the manifold and extending through the exhaust chamber 20. Into the outer end of the inlet 32 screws a nipple 33 of a valve 34 having a valve body 35 in which is mounted to turn a valve plug 36 provided with a valve stem 37 journaled in the ends of the valve body 35. The outer end of the valve stem 37 is provided with a handle 38 under the control of the operator for turning the valve plug 36 in the valve casing 35. The valve plug 36 is provided with two ports 40 and 41 of which the port 40 is adapted to register with a port 42 formed in the valve casing 35 and leading to an air inlet 43 formed integrally on the valve body 35. The other valve port 41 is adapted to register with a nipple 44 connected with a suitable steam supply, for instance, the radiator of an automobile, to allow the steam to pass into the valve 34 to mix with the air passing into the valve through the air inlet 43. The mixture of air and steam passes by way of the nipple 33 and the inlet 32 into the mixing and superheating chamber 30 in which the air and steam are intimately mixed and are heated by the exhaust gases within the exhaust chamber 20 prior to their passage through the port 31 into the branch pipes 13 and 14. In order to facilitate the commingling of the air and steam and to insure thorough superheating thereof, the mixing and superheating chamber 30 is preferably provided with baffles 50 and 51 to provide a long passage for the mixture of air and steam through the chamber 30.

It will be noticed that by the operator manipulating the valve plug 36 more or less air and steam can be admitted to the mixing and superheating chamber 30, and the air or the steam may be entirely cut off on the operator correspondingly turning the valve plug 36 so that only superheated air or superheated steam passes to the explosive mixture traveling through the branch pipes 13 and 14 on their way from the carbureter to the engine cylinders.

It is understood that by the arrangement described the mixing and superheating chamber 30 is highly heated by the exhaust gases passing into the exhaust chamber 20 especially as the said mixing and superheating chamber forms an integral part of the manifold and extends within the exhaust chamber 20.

It will further be noticed that the air or the steam or a mixture of both is highly heated prior to entering the passages for the explosive mixture and consequently such mixture is enriched and thus rendered exceedingly powerful.

Having thus described my invention, I claim as new and desire to secure by Letters Patent:—

1. In a superheating manifold for internal combustion engines, a body formed in one piece, having a passage adapted to connect the carbureter with the engine cylinders, and an exhaust chamber connected with the exhausts of the engine cylinders, a mixing and superheating chamber integral with the body and extending within the said exhaust chamber, the said mixing chamber being contiguous to and opening into the said passage, and means supplying the said mixing chamber with air or steam or a mixture of both from the exterior of the body.

2. A superheating manifold for internal combustion engines, having an internal passage adapted to connect the carbureter with the engine cylinders, and an exhaust chamber connected with the exhausts of the engine cylinders, a mixing and superheating chamber integral with the manifold and extending within the said exhaust chamber, the wall of said passage having an opening connecting the said mixing chamber with the said passage, integral baffles within the said mixing and superheating chamber, an inlet leading from the mixing and superheating chamber through the exhaust chamber, and means connected with the inlet for supplying the said heating chamber with air or steam or a mixture of both.

3. A superheating manifold for internal combustion engines, having a passage therethrough adapted to connect the carbureter with the engine cylinders, and an exhaust chamber connected with the exhausts of the engine cylinders, a mixing and superheating chamber integral with the manifold and extending within the said exhaust chamber, the said mixing chamber being formed upon one side of the said passage and connected thereto by a port, an integral inlet for the said chamber and extending through the exhaust chamber to the outside of the manifold, and a valve externally of the manifold and connected with the said inlet and having an inlet for air and an inlet for steam.

4. A superheating manifold for internal combustion engines, having a Y-shaped passage adapted to connect the carbureter with the engine cylinders, and an exhaust chamber connected with the exhausts of the engine cylinders, a mixing and superheating chamber integral with the manifold and extending within the said exhaust chamber and located in the angle between the branches of said passage, the wall between the said mixing chamber and the said passage having a port communicating therebetween, an integral inlet for the said chamber and extending through the exhaust chamber to the outside of the manifold, and a valve connected with the said inlet and having an inlet for air and an inlet for steam, the said valve controlling the said air and steam inlets.

JOHN G. LAWSHE.